United States Patent
Azami

(10) Patent No.: US 9,509,906 B2
(45) Date of Patent: Nov. 29, 2016

(54) IMAGE PROCESSING APPARATUS, METHOD FOR PROCESSING IMAGE, AND COMPUTER PROGRAM

(71) Applicant: JVC KENWOOD CORPORATION, Yokohama-shi (JP)

(72) Inventor: Tomohiro Azami, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 68 days.

(21) Appl. No.: 14/472,250

(22) Filed: Aug. 28, 2014

(65) Prior Publication Data

US 2014/0368693 A1    Dec. 18, 2014

Related U.S. Application Data

(63) Continuation of application No. PCT/JP2013/053707, filed on Feb. 15, 2013.

(30) Foreign Application Priority Data

Feb. 29, 2012   (JP) .................................. 2012-044754

(51) Int. Cl.
   *H04N 5/232*   (2006.01)
   *H04N 5/92*   (2006.01)
   *H04N 9/82*   (2006.01)
   *H04N 5/77*   (2006.01)

(52) U.S. Cl.
   CPC ...... *H04N 5/23229* (2013.01); *H04N 5/23216* (2013.01); *H04N 5/772* (2013.01); *H04N 5/92* (2013.01); *H04N 9/8205* (2013.01); *H04N 5/23293* (2013.01)

(58) Field of Classification Search
   CPC ..................... H04N 13/0066; H04N 5/23293; G06F 17/30265; G06F 17/30268; G06F 17/3028; G08B 13/19671; G08B 13/19673
   See application file for complete search history.

(56) References Cited

U.S. PATENT DOCUMENTS

2008/0062283 A1   3/2008   Matsushita et al.
2011/0085055 A1   4/2011   Matsushita et al.

FOREIGN PATENT DOCUMENTS

| JP | 2000-217060 A | 8/2000 |
| JP | 2006-295889 A | 10/2006 |
| JP | 2007-228608 A | 9/2007 |
| JP | 2010-021638 A | 1/2010 |
| JP | 2010-050552 A | 3/2010 |

OTHER PUBLICATIONS

International Search Report and Written Opinion in PCT International Application No. PCT/JP2013/053707, dated May 21, 2013.

*Primary Examiner* — Christopher K Peterson
(74) *Attorney, Agent, or Firm* — Venable LLP; Michael A. Sartori

(57) ABSTRACT

An image processing apparatus includes a taken image data acquiring unit configured to acquire taken image data, a storage unit configured to store therein one or more pieces of interface data for designating a tag to be attached to the taken image data, an imaging situation information acquiring unit configured to acquire information on an imaging situation of the taken image data, an interface identifying unit configured to identify at least one piece of interface data from among the pieces of interface data stored in the storage unit based on the information on the imaging situation acquired by the imaging situation information acquiring unit, and a display image generating unit configured to generate interface image data from the interface data identified by the interface identifying unit and to generate image data for display from the generated interface image data and the taken image data.

7 Claims, 11 Drawing Sheets

| POSITION | UI |
|---|---|
| 35.XX LATITUDE AND 139.XX LONGITUDE (BALLPARK A) | BASEBALL UI |
| 36.YY LATITUDE AND 139.YY LONGITUDE (GYMNASIUM B) | BASKETBALL UI |
| ... | ... |

FIG.9A

| GROUP MEMBER | UI |
|---|---|
| A-san, B-san | TENNIS UI |
| B-san | BIKE UI |
| C-san, D-san, E-san, F-san, G-san, and H-san | FUTSAL UI |
| ... | ... |

FIG.9B

| GROUP MEMBER | MATCH CONDITION | UI |
|---|---|---|
| A-san, B-san | INCLUDE | TENNIS UI |
| B-san | PERFECT MATCH | BIKE UI |
| C-san, D-san, E-san, F-san, G-san, and H-san | PARTIALLY INCLUDE AND LESS THAN 10 IN ALL | FUTSAL UI |
| C-san, D-san, E-san, F-san, G-san, and H-san | PARTIALLY INCLUDE AND 10 OR MORE IN ALL | SOCCER UI |
| ... | ... | ... |

FIG.9C

| GROUP MEMBER | MATCH CONDITION | UI |
|---|---|---|
| I-san, J-san, K-san, L-san, M-san, and N-san | PARTIALLY INCLUDE AND LOCATION C | FUTSAL UI |
| I-san, J-san, K-san, L-san, M-san, and N-san | PARTIALLY INCLUDE AND LOCATION D | BEACH SOCCER UI |
| ... | ... | ... |

FIG.11

| POSITION | UI | DATE AND TIME |
|---|---|---|
| 35.XX LATITUDE AND 139.XX LONGITUDE (LOCATION A) | BASEBALL PRACTICE UI | 2011/04/04 (Tue) 15:00 |
| 35.XX LATITUDE AND 139.XX LONGITUDE (LOCATION A) | BASEBALL PRACTICE UI | 2011/04/05 (Wed) 15:00 |
| 35.XX LATITUDE AND 139.XX LONGITUDE (LOCATION A) | BASEBALL PRACTICE UI | 2011/04/06 (Thr) 15:20 |
| 35.XX LATITUDE AND 139.XX LONGITUDE (LOCATION A) | BASEBALL PRACTICE UI | 2011/04/07 (Fri) 15:00 |
| 35.XX LATITUDE AND 139.XX LONGITUDE (LOCATION A) | BASEBALL PRACTICE MATCH UI | 2011/04/08 (Sat) 13:00 |
| 35.XX LATITUDE AND 139.XX LONGITUDE (LOCATION A) | BASEBALL UI | 2011/04/09 (Sun) 18:00 |
| ... | ... | ... |
| 36.YY LATITUDE AND 139.YY LONGITUDE (LOCATION B) | BASKETBALL UI | 2011/05/14 (Sat) 13:00 |
| 36.YY LATITUDE AND 139.YY LONGITUDE (LOCATION B) | KENDO UI | 2011/05/15 (Sun) 18:00 |
| 36.YY LATITUDE AND 139.YY LONGITUDE (LOCATION B) | KENDO UI | 2011/05/18 (Wed) 16:00 |
| ... | ... | ... |

IMAGE PROCESSING APPARATUS, METHOD FOR PROCESSING IMAGE, AND COMPUTER PROGRAM

CROSS-REFERENCE TO RELATED APPLICATION(S)

This application is a continuation of International Application No. PCT/JP2013/053707, filed on Feb. 15, 2013 which claims the benefit of priority of the prior Japanese Patent Application No. 2012-044754, filed on Feb. 29, 2012, the entire contents of which are incorporated herein by reference.

BACKGROUND OF THE INVENTION

1. Field of the Invention

The present invention relates to an image processing apparatus, a method for processing an image, and a computer program.

2. Description of the Related Art

A technology is known that when taking moving images and still images using an imaging apparatus such as a video camera, a user automatically or manually gives to taken image data tags (information on a shooting location, a photographer, or a photographic subject, for example) for identifying and searching for the taken image data. By using the tags, the user can easily perform organization and searching of the taken image data.

Japanese Patent Application Laid-open No. 2010-21638, for example, discloses a technology that gives surrounding keywords derived from the position of an imaging apparatus and map data to an image frame during imaging as tags. Japanese Patent Application Laid-open No. 2007-228608 discloses a digital still camera that displays a human figure icon row and a genre-specific icon row related to tags on a display screen and can easily give the tags to an image during imaging by selecting icons.

However, the imaging apparatus disclosed in Japanese Patent Application Laid-open No. 2010-21638 and the digital still camera disclosed in Japanese Patent Application Laid-open No. 2007-228608 do not allow a user to easily select, in accordance with an imaging situation or the like, a tag suitable for the imaging situation or the like from among various tags and to give the tag to taken image data. It is considered that, for example, the type and contents of a tag a user desires to give differ in accordance with the type of sports (baseball, soccer, basketball, or the like) to be imaged. However, the imaging apparatus disclosed in Japanese Patent Application Laid-open No. 2010-21638 and the digital still camera disclosed in Japanese Patent Application Laid-open No. 2007-228608 cannot easily select and give a tag appropriate for the type of these sports from among various tags.

SUMMARY OF THE INVENTION

It is an object of the present invention to at least partially solve the problems in the conventional technology.

The present invention provides an image processing apparatus that includes: a taken image data acquiring unit configured to acquire taken image data; a storage unit configured to store therein one or more pieces of interface data for designating a tag to be attached to the taken image data; an imaging situation information acquiring unit configured to acquire information on an imaging situation of the taken image data; an interface identifying unit configured to identify at least one piece of interface data from among the pieces of interface data stored in the storage unit based on the information on the imaging situation acquired by the imaging situation information acquiring unit; and a display image generating unit configured to generate interface image data from the interface data identified by the interface identifying unit and to generate image data for display from the generated interface image data and the taken image data.

The present invention also provides a method for processing an image that includes: acquiring taken image data; acquiring information on an imaging situation of the taken image data; referring to a storage unit that stores therein one or more pieces of interface data for designating a tag to be attached to the taken image data based on the acquired information on the imaging situation and identifying at least one piece of interface data; and generating interface image data from the identified interface data and generating image data for display from the generated interface image data and the taken image data.

The present invention further provides a computer program that causes a computer to execute: acquiring taken image data; acquiring information on an imaging situation of the taken image data; referring to a storage unit that stores therein one or more pieces of interface data for designating a tag to be attached to the taken image data based on the acquired information on the imaging situation and identifying at least one piece of interface data; and generating interface image data from the identified interface data and generating image data for display from the generated interface image data and the taken image data. The present invention also provides an image processing apparatus that includes: a storage unit configured to store therein one or more pieces of interface data for designating a tag to be attached to taken image data; an imaging situation information acquiring unit configured to acquire information on an imaging situation of the taken image data; an interface identifying unit configured to identify at least one piece of interface data from among the pieces of interface data stored in the storage unit based on the information on the imaging situation acquired by the imaging situation information acquiring unit; and an output unit configured to output the interface data identified by the interface identifying unit. The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9A is a conceptual diagram illustrating a specific example of group-UI correspondence information according to the second embodiment;

FIG. 9B is a conceptual diagram illustrating a specific example of the group-UI correspondence information according to the second embodiment;

FIG. 9C is a conceptual diagram illustrating a specific example of the group-UI correspondence information according to the second embodiment;

FIG. 11 is a conceptual diagram illustrating the configuration of position-UI correspondence information according to a third embodiment.

DETAILED DESCRIPTION OF THE PREFERRED EMBODIMENTS

First Embodiment

Figure 1A:
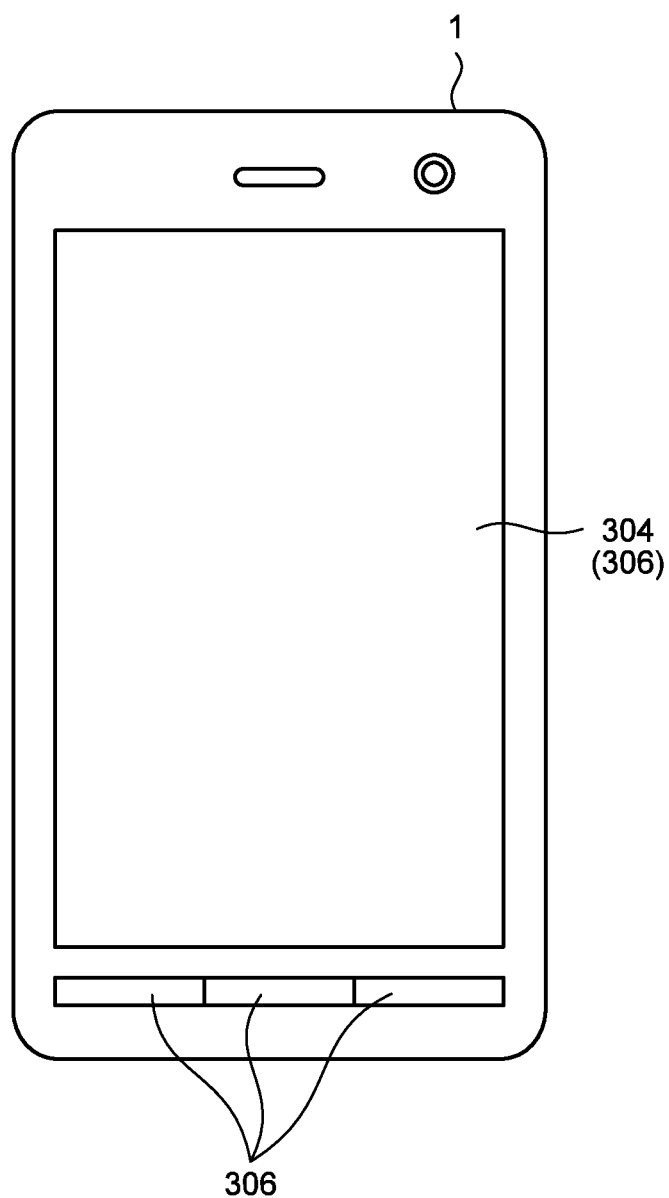
FIG. 1A is a diagram illustrating the appearance of an imaging apparatus according to a first embodiment.
Figure 1B:
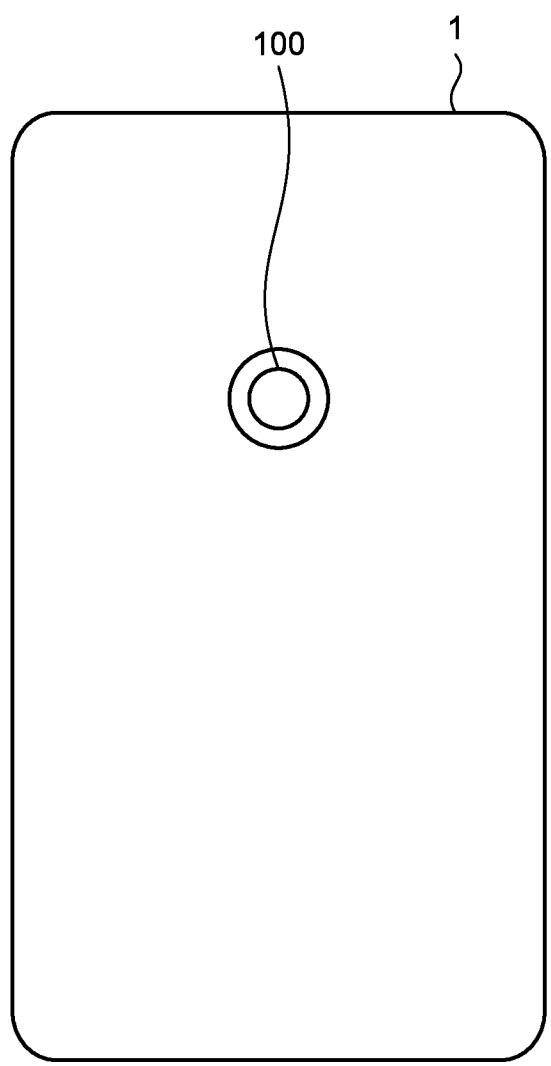
FIG. 1B is a diagram illustrating the appearance of the imaging apparatus according to the first embodiment.

The following describes embodiments according to the present invention with reference to the drawings. FIG. 1A and FIG. 1B are appearance diagrams of an imaging apparatus 1 according to the first embodiment. The imaging apparatus 1 is a portable terminal apparatus such as a smartphone. FIG. 1A is a front view of the imaging apparatus 1, whereas FIG. 1B is a rear view of the imaging apparatus 1. The imaging apparatus 1 has an imaging unit 100 for taking images on the rear side thereof and can take still images and moving images. The imaging apparatus 1 also has on the front side a liquid crystal monitor 304 as a display unit that displays the still images and moving images taken by the imaging unit 100. The imaging apparatus 1 according to the present embodiment is not limited in its shape and constitution so long as it can take still images or moving images and includes a display unit (a liquid crystal display, for example). In other words, the imaging apparatus 1 is not limited to the portable terminal apparatus and may be any electronic apparatus (such as a digital video camera) having an imaging unit and a display unit.

Figure 2:
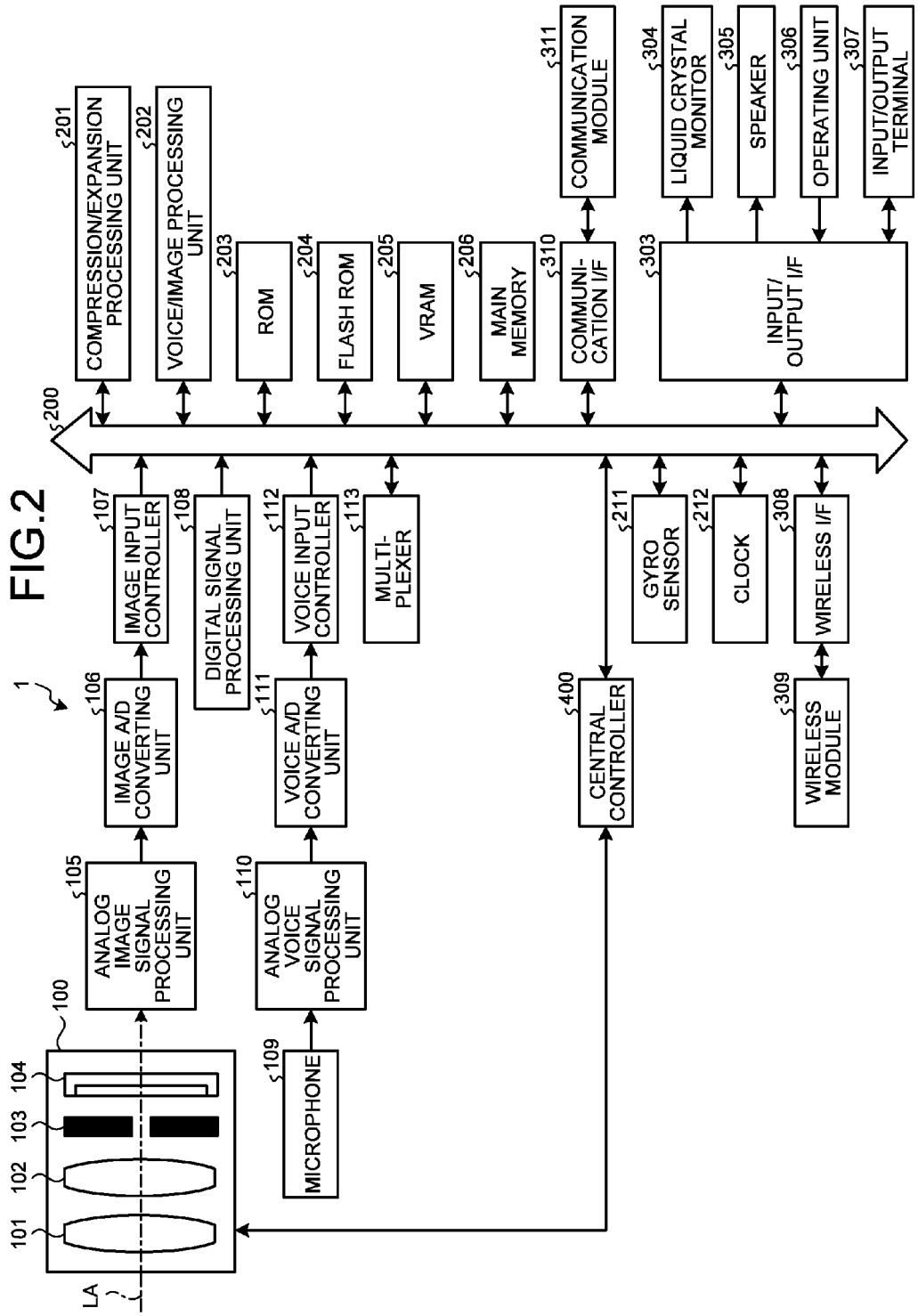
FIG. 2 is a block diagram illustrating the configuration of the imaging apparatus according to the first embodiment.

Next, the configuration of the imaging apparatus 1 is described with reference to FIG. 1A, FIG. 1B, and FIG. 2. FIG. 2 is a block diagram illustrating the internal configuration of the imaging apparatus 1 according to the present embodiment.

A central controller 400 includes a semiconductor integrated circuit including a central processing unit (CPU), a read only memory (ROM) storing various kinds of computer programs, and a random access memory (RAM) as a work area and comprehensively controls the processing of the entire imaging apparatus 1 such as imaging, display of various kinds of images, and identification of an image (hereinafter, referred to as an "interface image") related to a graphical user interface (GUI) in which icon images corresponding to the type or the like of tags used in accordance with an imaging situation are appropriately arranged in order for a user to input the tags to taken image data. The internal configuration of the central controller 400 is described below with reference to FIG. 3.

The imaging apparatus 1 includes the imaging unit 100 including a zoom lens 101, a focus lens 102, an aperture 103, and an imaging element 104. The zoom lens 101 moves along an optical axis LA by a zoom actuator (not illustrated). Similarly, the focus lens 102 moves along the optical axis LA by a focus actuator (not illustrated). The aperture 103 operates by being driven by an aperture actuator (not illustrated). The imaging element 104 includes a charge coupled device (CCD) and a complementary metal oxide semiconductor (CMOS).

Imaging using the imaging unit 100 is performed as follows. The imaging element 104 performs photoelectric conversion on light passed through the zoom lens 101, the focus lens 102, and the aperture 103 to generate an analog image signal of a subject. An analog image signal processing unit 105 amplifies this analog image signal, and then an image A/D converting unit 106 converts the amplified signal into digital image data. An image input controller 107 captures the digital image data output from the image A/D converting unit 106 as taken image data and stores it in a main memory 206 via a bus 200.

A digital signal processing unit 108 captures the taken image data stored in the main memory 206 based on an instruction from the central controller 400 via the bus 200 and performs certain signal processing thereon to generate data including a brightness signal and a color-difference signal. The digital signal processing unit 108 also performs various kinds of digital correction such as offset processing, white balance adjustment processing, gamma correction processing, RGB complementary processing, noise reduction processing, contour correction processing, color tone correction processing, and light source type determination processing.

A microphone 109 collects ambient voices during imaging to generate an analog voice signal. An analog voice signal processing unit 110 amplifies the analog voice signal, and then a voice A/D converting unit 111 converts the amplified signal into digital voice data. A voice input controller 112 stores the digital voice data output from the voice A/D converting unit 111 in the main memory 206 together with the taken image data.

A multiplexer 113 multiplexes the taken image data and the digital voice data stored in the main memory 206 to generate stream data.

A compression/expansion processing unit 201 performs certain compression processing on the stream data stored in the main memory 206 in accordance with an instruction from the central controller 400 via the bus 200 to generate compressed data. The compression/expansion processing unit 201 performs certain type of expansion processing on the compressed data stored in the main memory 206 or the like in accordance with an instruction from the central controller 400 to generate uncompressed data. The imaging apparatus 1 according to the present embodiment employs a compression system compliant with JPEG standards for still images and a compression system compliant with MPEG2 standards or AVC/H.264 standards for moving images.

A voice/image processing unit 202 performs certain image processing on the digital data read from the main memory 206 in accordance with an instruction from the central controller 400 via the bus 200. The voice/image processing unit 202 generates, for example, image data for various kinds of processing such as a menu image and an on screen display (OSD) image, superimposes the image data on the original taken image data read from the main memory 206, and outputs the superimposed image data to the liquid crystal monitor 304. This output causes the image displayed on the liquid crystal monitor 304 to be an image in which various kinds of image data are combined or superimposed. The voice/image processing unit 202 superimposes or combines the interface image on the taken image and displays the superimposed or combined image on the liquid crystal monitor 304. The details are described below. In place of the liquid crystal monitor 304, other monitors such as an organic electro-luminescence (EL) monitor may be used.

A ROM 203 is connected to the central controller 400 via the bus 200 and stores therein control programs executed by the central controller 400, various data required for the control, and the like. A flash ROM 204 stores therein various kinds of setting information related to the operation of the imaging apparatus 1 such as user setting information.

A VRAM 205 is used as a temporary storage area for image data for display. The main memory 206 is used as a temporary storage area for various kinds of image data and is also used as a computing work area for the central controller 400.

A gyro sensor 211 detects changes in triaxial acceleration and angular velocity. In accordance with a detection result of the gyro sensor 211, the display orientation of the liquid crystal monitor 304 is changed. A clock 212 generates information on the acquisition date and time of the taken image data, and the generated information may be used as a tag.

The liquid crystal monitor 304, a speaker 305, an operating unit 306, and an input/output terminal 307 are connected to an input/output I/F 303. The liquid crystal monitor 304 displays, for example, images generated from various kinds of image data such as taken image data temporarily recorded in the VRAM 205 or the main memory 206, interface image data, and various kinds of menu data. It goes without saying that the taken image data output to the liquid crystal monitor 304 includes not only image data recorded in a recording medium (not illustrated) such as a card type recording medium by turning on a record button (not illustrated) of the operating unit 306 by a user, but also data related to what is called a through image that is displayed on the liquid crystal monitor 304 for the user to check contents to be imaged. The speaker 305 outputs, for example, a voice temporarily stored in the main memory 206. The operating unit 306 includes operating buttons or a touch panel arranged on the liquid crystal monitor 304 and receives operation input to the imaging apparatus 1 by the user. The input/output terminal 307 is connected to a television monitor, a personal computer (PC) (not illustrated), or the like.

A wireless module 309 transmits and receives data to and from other apparatuses via the bus 200 and a wireless I/F 308. Wireless communication of various kinds of information, taken image data, or the like is performed by a method compliant with IEEE802.11 standards. More specifically, the wireless module 309 performs communication processing compliant with wireless LAN standards such as Wi-Fi.

A communication module 311 performs e-mail transmission and reception with other communication terminals and Internet connection via the bus 200 and a communication I/F 310. Such wireless communication is, for example, performed by a method compliant with communication standards such as W-CDMA and CDMA2000. This enables communication with a base station. The communication standards of the communication by the communication module 311 are not limiting. The communication module 311 performs wireless communication by a communication method different from the wireless module 309.

Figure 3:
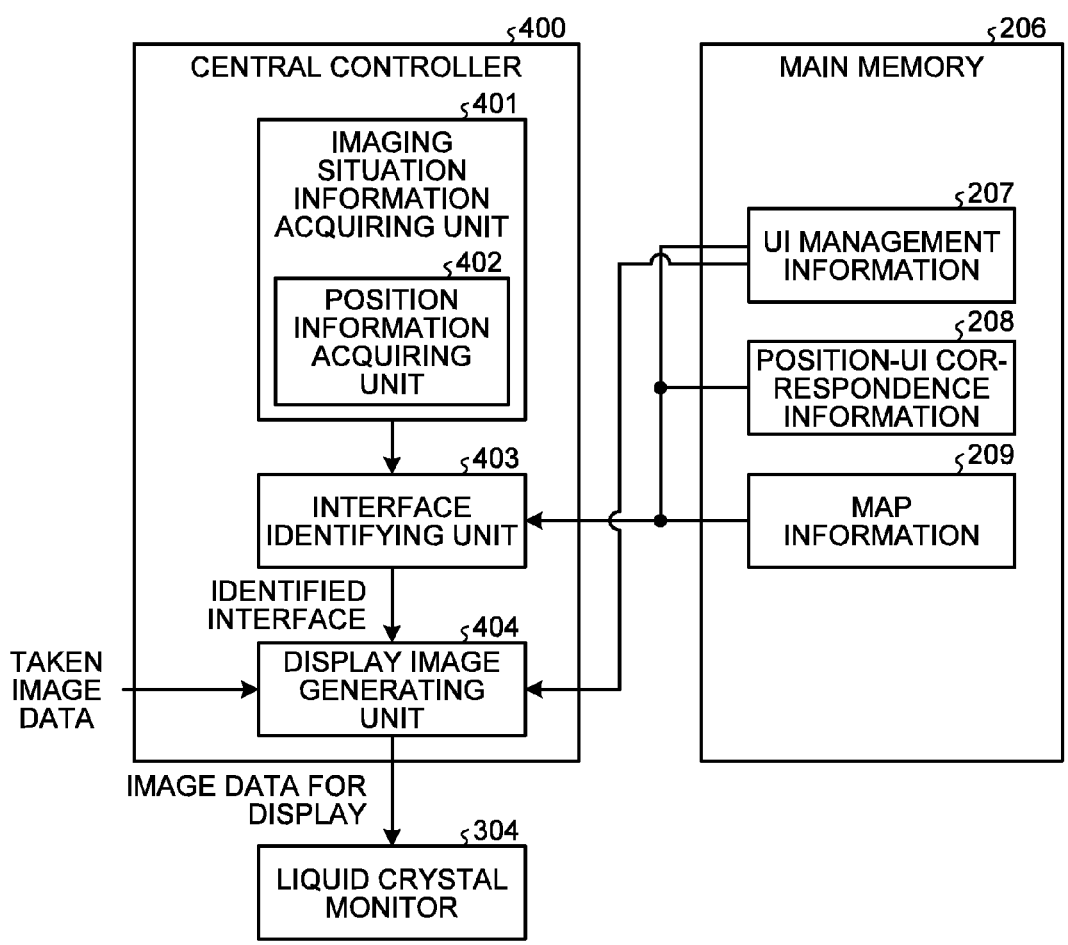
FIG. 3 is a block diagram illustrating the configuration of a central controller according to the first embodiment.

The following describes the internal configuration of the central controller 400 and related configuration with reference to FIG. 3. FIG. 3 appropriately omits the bus 200, the input/output I/F 303, and the like. The central controller 400 includes an imaging situation information acquiring unit 401, an interface identifying unit 403, and a display image generating unit 404.

The imaging situation information acquiring unit 401 acquires information on an imaging situation of the imaging apparatus 1. The imaging situation is a concept including an imaging position, an imaging time, an imaging person, a subject to be imaged (subject) and its number, weather during imaging, and an analysis state (imaging a subject with large movement, for example) of an image (a still image or a moving image) during imaging. The present embodiment describes a case as an example in which the imaging situation information acquiring unit 401 acquires information on the imaging position as the imaging situation.

The imaging situation information acquiring unit 401 includes a position information acquiring unit 402. The position information acquiring unit 402 acquires a current position where the imaging apparatus 1 is present. The position information acquiring unit 402 is, for example, a processing unit having a global positioning system (GPS) function. The position information acquiring unit 402, when starting imaging or the like, acquires information on the current position and supplies the acquired current position to the interface identifying unit 403.

The main memory 206 stores therein a plurality of pieces of information (hereinafter, referred to as "interface data") on interfaces for inputting tags in advance, and the interface identifying unit 403 selects and identifies interface data suitable for the information on the imaging situation acquired by the imaging situation information acquiring unit 401 from among the plurality of the pieces of interface data stored in advance. When the number of the pieces of interface data stored in the main memory 206 in advance is one, if the interface data fits the information on the imaging situation acquired by the imaging situation information acquiring unit 401, the stored interface data is identified.

The display image generating unit 404 generates interface image data related to the identified interface data. The interface image is displayed on the liquid crystal monitor 304 together with the taken image data.

The tag is information for use in identification or searching of images. Examples of the tag for moving images related to baseball may include information on a venue, score information, opponent information, a date and time, or the name of a meet.

The imaging apparatus 1 may use the type and contents of tags created in advance or may use the type and contents of tags created by a user separately. With regard to tags related to baseball, for example, information used for baseball in common including declarations by umpires such as "strike," "ball," "out," or "change," innings such as "top and bottom of the Nth inning," or scoring form such as "added by one run" is used as the tags created in advance. The name of a meet, the names of both teams, and the like are used as the tags created by a user separately. Similarly, as tags related to basketball, for example, information used for basketball in common including declarations by referees such as "foul" and "violation," periods such as "the first to the fourth," or scoring format such as "added by one to three points" is used as the tags created in advance. The name of a meet, the names of both teams, and the like are used as the tags created by a user separately.

The type and contents of the tags may be, for example, stored in the main memory 206 in advance or may be acquired from any storage device (what is called a USB memory or the like) that is attachable and detachable to and from a server (not illustrated) or the imaging apparatus 1. The respective processing units within the central controller 400 appropriately acquire the type and contents of the tags as needed. The user of the imaging apparatus 1 appropriately inputs theses tags while taking moving images. After the end of the imaging, the taken image data is identified or searched for using the given tags, thereby enabling to organize the taken image data and to reproduce or edit desired scenes. The tags can also be given to still images.

The interface data includes information identifying related tags among the stored tags and is stored in the main memory 206.

Figure 4A:
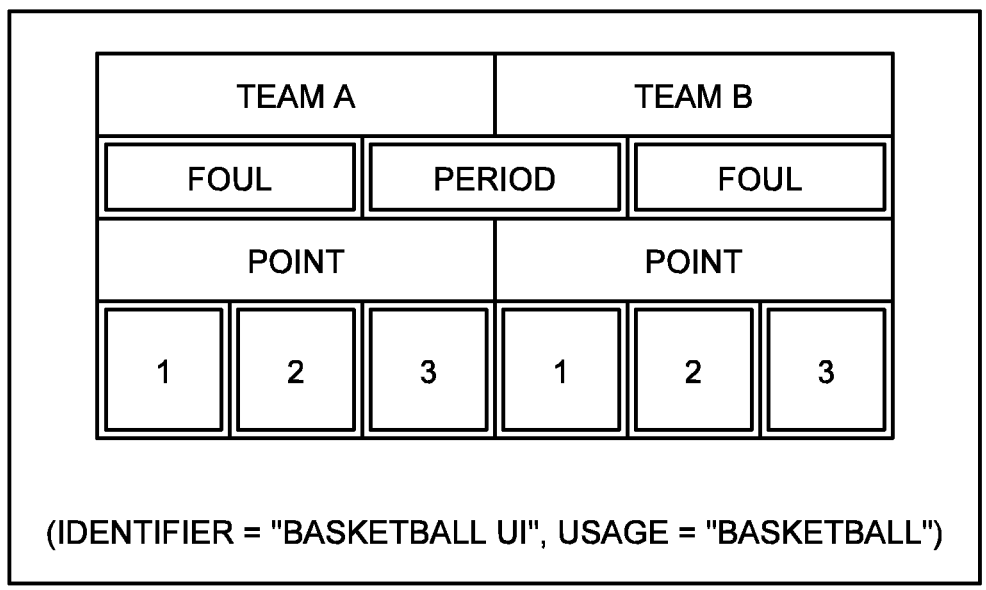
FIG. 4A is a conceptual diagram illustrating a specific example of an interface according to the first embodiment.
Figure 4B:
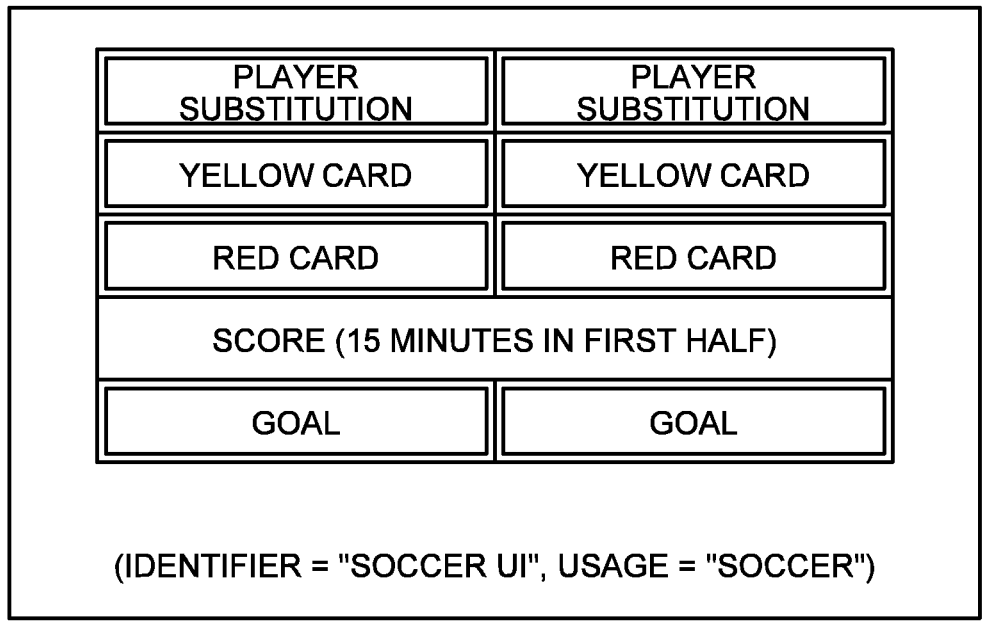
FIG. 4B is a conceptual diagram illustrating a specific example of the interface according to the first embodiment.

The interface identifying unit 403 reads UI management information 207, position-UI correspondence information 208, and map information 209 that are generated and stored in advance from the main memory 206. The UI management information 207 is management information including an identifier and usage ("baseball," "soccer," and "basketball," for example) associated with each other for each interface data for one or more stored interface data. FIG. 4A and FIG. 4B illustrate examples of the interface data, the interface image related to the interface data, and the UI management information.

FIG. 4A is an interface image (identifier="Basketball UI") generated based on the interface data for inputting tags while imaging basketball. As illustrated, the interface image is configured so that information on the names of the teams, a scoring process, and the like can be input as the tags. Similarly, FIG. 4B is an interface image (identifier="Soccer UI") generated based on the interface data for inputting tags while imaging soccer.

In order to give tags of different types and contents to the same sport, a plurality of pieces of interface data may be prepared. Interface data for match and interface data for practice (interface data capable of inputting a practice menu as a tag, for example) may be configured differently, for example. It goes without saying that, without being limited to sports, interface data for imaging dramas, music concerts, or the like may be present.

Figures 5, 6:
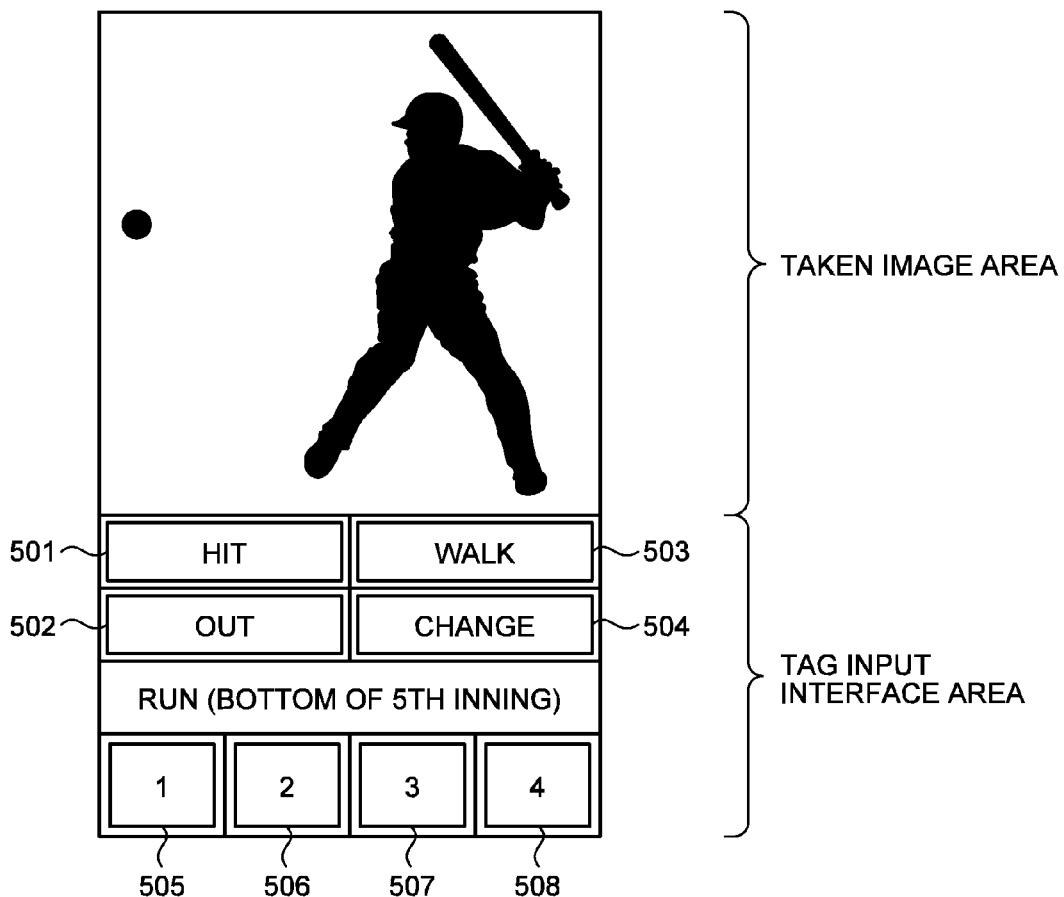
FIG. 5 is a conceptual diagram illustrating the configuration of position-UI correspondence information according to the first embodiment.
FIG. 6 is a conceptual diagram illustrating a specific example of an image for display according to the first embodiment.

The position-UI correspondence information 208 is information indicating a correspondence relation between position information and UI management information associated with the interface data related to the interface image displayed on the liquid crystal monitor 304. FIG. 5 is a diagram illustrating the configuration of the position-UI correspondence information 208. The example of FIG. 5 defines that an interface with an identifier of "Baseball UI" is used at Ballpark A (35.XX latitude and 139.XX longitude) and that an interface with an identifier of "Basketball UI" is used at Gymnasium B (36.YY latitude and 139.YY longitude).

The user may manually set the correspondence relation within the position-UI correspondence information 208, and the correspondence relation may be information downloaded from a network. Alternatively, it may be configured that interface data selected manually by the user from an interface selection screen and position information when the selection operation is performed are successively reflected in the position-UI correspondence information 208. For the ease of description and understanding, it is assumed that in the present embodiment, the position in the position-UI correspondence information 208 and the interface data are associated with each other on a one-to-one basis.

The map information 209 is information indicating the relation between the position information and a facility (a sports facility, for example) present at the position. The map information 209 is not required to be stored in the main memory 206 and may be downloaded from any server on a network.

The interface identifying unit 403 selects and identifies interface data to be displayed based on the information on the current position. Specifically, the interface identifying unit 403 searches whether interface data corresponding to the current position is set based on the UI management information 207 and the position-UI correspondence information 208. When the corresponding interface data is present, the interface identifying unit 403 identifies the interface data as an object to be notified to the display image generating unit 404. When there is no corresponding interface data, the interface identifying unit 403 searches the map information 209 for any facility corresponding to the current position. When there is a corresponding facility, the interface identifying unit 403 identifies interface data to be displayed from the usage of the facility. When the current position is found to be a soccer stadium through the searching of the map information 209, the interface identifying unit 403 notifies the display image generating unit 404 of interface data whose usage is soccer and that is associated with an identifier of soccer. When there is no corresponding facility or when interface data cannot be uniquely determined (to be one), the interface identifying unit 403 notifies the display image generating unit 404 of an invalid value as the interface data (invalid value).

In the comparison processing with the current position, the interface identifying unit 403 may determine that positions for which a certain level of physical closeness is found correspond to each other. Positions separated by a distance similar to the distance between a main stand and a rear stand of the same soccer stadium, for example, may be determined to be the same position.

The taken image data (a still image or a moving image) and the interface data from the interface identifying unit 403 are input to the display image generating unit 404. The display image generating unit 404 generates the interface image data including icon image data related to icon images to be displayed and data related to the arrangement of the icon images to be displayed based on the notified interface data. The display image generating unit 404 generates image data for display in which the taken image data and the interface image data are combined.

When the invalid value as the interface data is notified, the display image generating unit 404 displays only the taken image data on the liquid crystal monitor 304. Alternatively, the display image generating unit 404 displays a screen prompting the user to select an interface on the liquid crystal monitor 304. When the user selects an interface, the information on the current position may be acquired from the imaging situation information acquiring unit 401, and a combination of the current position and the UI management information on the selected interface data may be stored as new data of the position-UI correspondence information 208.

The image data for display generated by the display image generating unit 404 is output from the input/output I/F 303 to the liquid crystal monitor 304. The liquid crystal monitor 304 displays an image for display related to the supplied image data for display. FIG. 6 is a diagram illustrating an example of the image for display displayed on the liquid crystal monitor 304. As illustrated in FIG. 6, the liquid crystal monitor 304 displays an image for display in which a taken image being currently taken and a related interface image are combined. The user, while viewing the taken image displayed on a taken image area, appropriately gives tags to the taken image data using the interface image displayed on a tag input interface area. When the user touches a hit button 501, for example, its time information and the tag "hit" are associated with each other and are stored in the main memory 206 (or any storage device). The same applies to an out button 502, a walk button 503, and a change button 504. Similarly, when a run is scored, run buttons 505 to 508 are touched (when a grand-slam homerun is hit, for example, the run button 508 indicating four runs is touched), thereby storing the time and scoring process in the main memory 206 (or any storage device). The interface image is not required to be displayed on the lower part of the display screen of the liquid crystal monitor 304 and can be arranged at any position and with any size. Other images such as a menu image may be displayed in combination.

Figure 7:
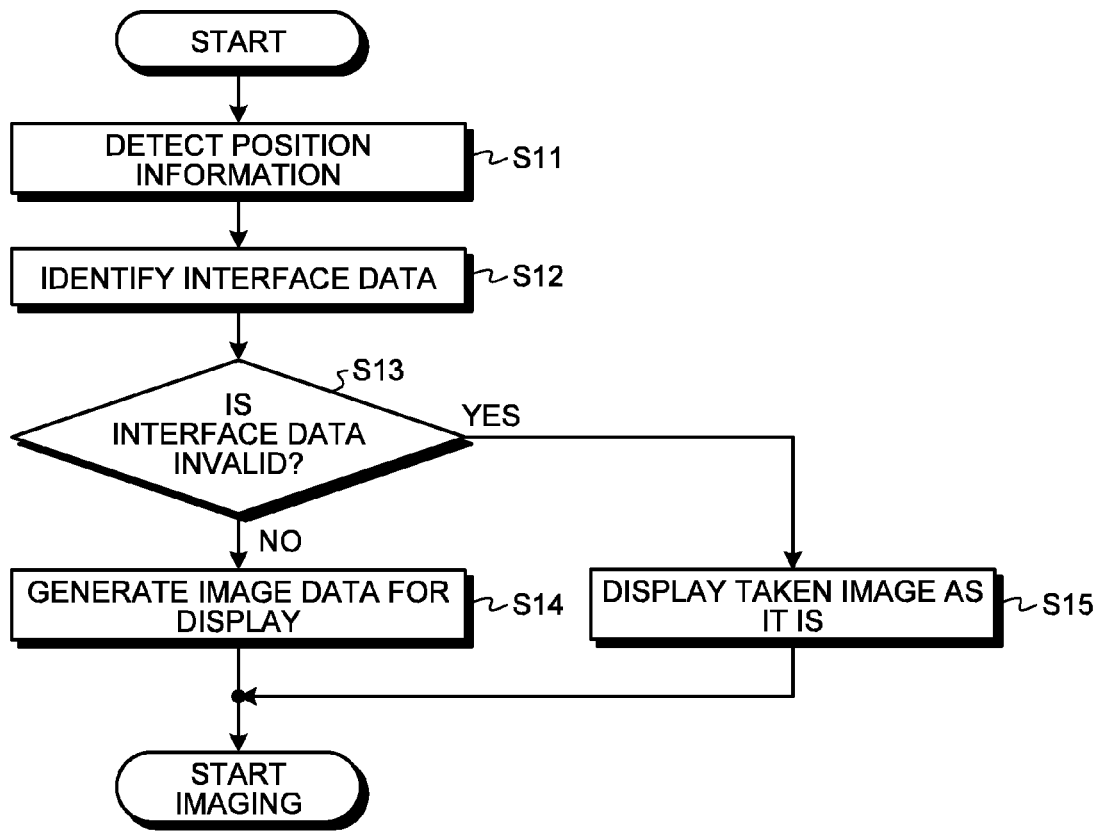
FIG. 7 is a flowchart illustrating the operation of the imaging apparatus according to the first embodiment.

Described next with reference to the flowchart illustrated in FIG. 7 is the setting operation of the interface image for inputting tags to the taken image in accordance with the imaging situation by the imaging apparatus 1 according to the present embodiment. First, at the timing of starting imaging or the like, the position information acquiring unit 402 acquires the information on the current position and supplies the information on the current position to the interface identifying unit 403 as information related to the imaging situation (S11).

The interface identifying unit 403 identifies interface data related to the interface image to be displayed based on the information on the current position, the position-UI correspondence information 208, and the map information 209 and notifies the display image generating unit 404 of the identified interface data (S12). When the interface cannot be uniquely identified, the interface identifying unit 403 notifies the display image generating unit 404 of the invalid value as the interface data (S12).

The display image generating unit 404 determines whether the interface data is the invalid value (S13). When it is not the invalid value (No at S13), the display image generating unit 404 generates the image data for display in which the interface image data corresponding to the interface data and the taken image data are combined and supplies the image data for display to the liquid crystal monitor 304 (S14). The liquid crystal monitor 304 displays the image data for display. When the notified interface data is the invalid value (Yes at S13), the display image generating unit 404 supplies only the taken image data to the liquid crystal monitor 304. The liquid crystal monitor 304 displays the taken image data as it is (S15). At S15, the display image generating unit 404 may generate interface selection image data to display a section screen related to the generated selection image data on the liquid crystal monitor 304.

The imaging apparatus 1 according to the present embodiment automatically selects the interface in accordance with the imaging situation and displays the image for display in which the taken image and the interface image generated based on the selected interface data are combined on the liquid crystal monitor 304. In other words, even when the user performs imaging operation by changing the imaging situation, imaging and tag input processing can be performed using the image for display in which an appropriate interface is displayed without selecting the interface by the user. The interface is automatically selected in accordance with the imaging situation, thereby enabling the user to save the trouble of selecting the interface.

The present embodiment acquires the information on the imaging position as the imaging situation and selects the interface in accordance with the position. In general, it is often the case that once the imaging position is determined, the subject to be imaged is also determined. The interface identifying unit 403 refers to the position-UI correspondence information 208, which defines the relation between the position and the interface, and selects the most suitable interface for the current position, thereby enabling to select the interface with high precision.

Even when the interface corresponding to the current position is not defined in the position-UI correspondence information 208, the interface identifying unit 403 can select the interface corresponding to the current position by referring to the map information 209. Owing to this, even when imaging is performed at a location (a remote sports stadium, for example) where the user does not usually perform imaging, an appropriate interface can be selected.

For the ease of description and understanding, the above embodiment describes a case in which the position information in the position-UI correspondence information 208 and the interface data are associated with each other on a one-to-one basis and the interface identifying unit 403 identifies one piece of interface data. The interface identifying unit 403 can also identify a plurality of pieces of interface data from one piece of position information.

In this case, a table is recorded that associates the position information in the position-UI correspondence information 208 and the interface data with each other on a one-to-many basis, and the pieces of identified interface data are subjected to processing such as allowing the user to finally select the interface data to be used based on an order of priority set in advance and displaying a plurality of interface images related to interface data identified by, for example, reducing the display size of the interface image data to be output.

Second Embodiment

Next, the second embodiment according to the present invention is described. The present embodiment is characterized in that an appropriate interface is selected in accordance with a subject to be imaged (subject) or a group constitution of subjects to be imaged.

Figure 8:
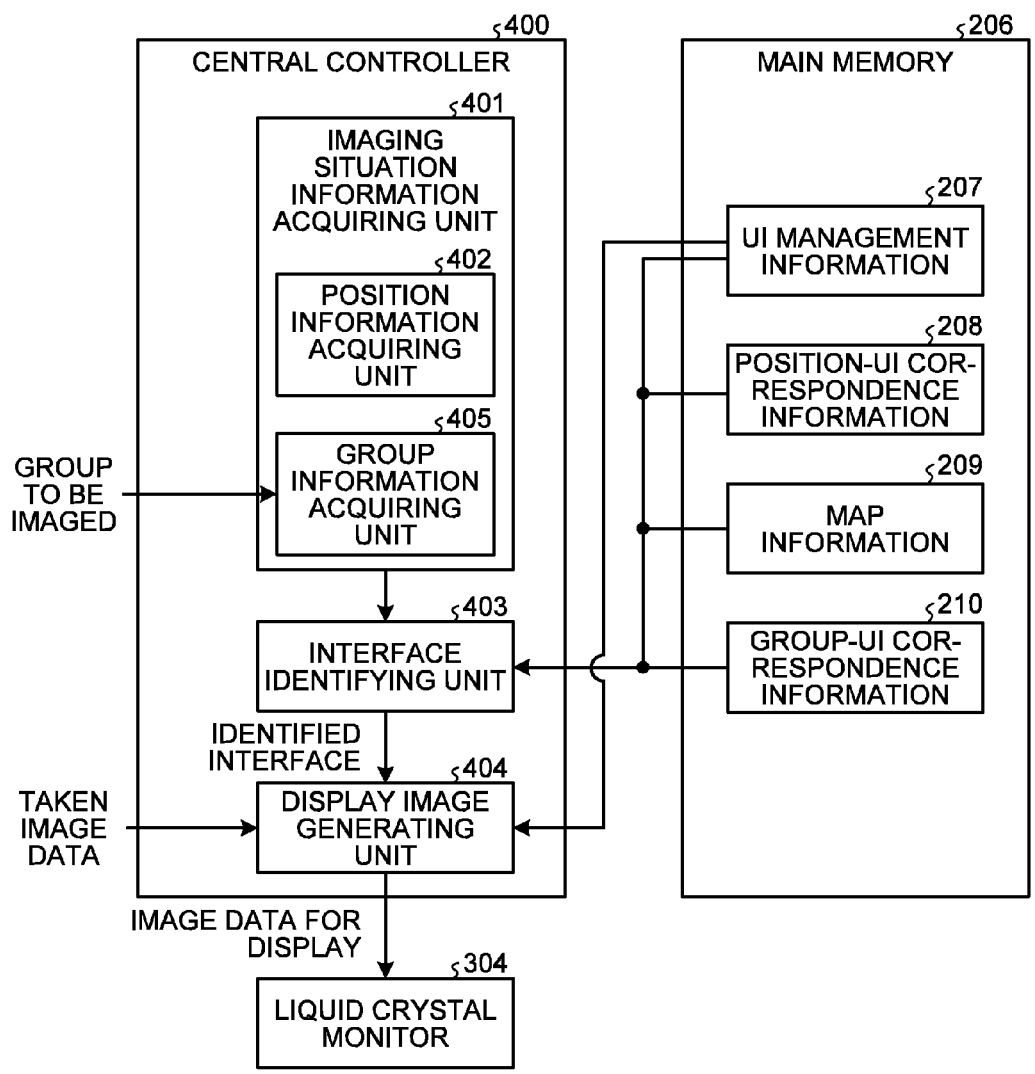
FIG. 8 is a block diagram illustrating the configuration of a central controller according to a second embodiment.

Although the configuration of the imaging apparatus according to the present embodiment is similar to the configuration of the first embodiment illustrated in FIG. 2, the second embodiment is different from the first embodiment in that information on a person or a group of persons to be imaged (hereinafter, simply referred to as a "group to be imaged;" the group to be imaged may include one person) is used as the information on the imaging situation. FIG. 8 is a block diagram illustrating the configuration (and its neighboring configuration) of the central controller 400 according to the present embodiment.

The imaging situation information acquiring unit 401 includes a group information acquiring unit 405. The main memory 206 stores therein the UI management information 207 and group-UI correspondence information 210.

The group information acquiring unit 405 acquires information (hereinafter, simply referred to as "subject information") on a group of subjects to be imaged by the following method, for example. The group information acquiring unit 405 supplies the acquired subject information to the interface identifying unit 403.

The imaging apparatuses 1 held by respective users, for example, appropriately notify a server (not illustrated) that "imaging is started at Location X," "A-san and B-san are going to be imaged now," or the like. The server collects the information transmitted from the respective imaging apparatuses 1 and transmits information on a group to be imaged from this time on to the respective imaging apparatuses 1. The group information acquiring unit 405 acquires the subject information based on this information. When A-san, B-san, and C-san individually notify the server that "imaging is started at Location X" from the respective imaging apparatuses 1, for example, the server notifies the respective imaging apparatuses 1 that a group to be imaged of "A-san, B-san, and C-san" starts imaging. When A-san, B-san, and C-san individually notify the server that "imaging is started at Athletic Meet Y," the server notifies the respective imaging apparatuses 1 that a group to be imaged of "A-san, B-san, and C-san" starts imaging.

Alternatively, the user can display a general address book interface image on the liquid crystal monitor 304 and appropriately select a user to be imaged. The group information acquiring unit 405 acquires the user selected through operation on this address book interface image as the subject information. The above method for identifying the group to be imaged is merely an example, and the group to be imaged may be identified to acquire the subject information by using any other method.

Next, the group-UI correspondence information 210 is described. The group-UI correspondence information 210 is person correspondence information indicating the correspondence relation between the person or the group of persons to be imaged and the UI management information associated with the interface data related to the interface image to be displayed. FIG. 9A is a diagram illustrating an example of the group-UI correspondence information 210. FIG. 9A defines that when "A-san and B-san" are the group of persons to be imaged, "Tennis UI" is used, and when "B-san" is the group of persons to be imaged, "Bike UI" is used, or the like.

The group-UI correspondence information 210 may define detailed correspondence relations about groups. FIG. 9B illustrates an example. FIG. 9B defines that "when the subject to be imaged is a group including A-san and B-san, Tennis UI is used," "when the subject to be imaged is only B-san, Bike UI is used," "when the subject to be imaged partially includes C-san, D-san, E-san, F-san, G-san, and H-san and includes less than 10 in all, Futsal UI is used," "when the subject to be imaged partially includes C-san, D-san, E-san, F-san, G-san, and H-san and includes 10 or more in all, Soccer UI is used," or the like. The group-UI correspondence information 210 may be configured so that the user can appropriately create or edit it.

With reference to FIG. 8 again, the operation of the interface identifying unit 403 is described. The subject information is input from the group information acquiring unit 405 to the interface identifying unit 403. The interface identifying unit 403 reads the group-UI correspondence information 210 from the main memory 206. The interface identifying unit 403 identifies the interface data in accordance with a comparison between the subject information and the group-UI correspondence information 210. The interface identifying unit 403 notifies the display image generating unit 404 of the selected interface data. When the group to be imaged and the corresponding interface data are not defined in the group-UI correspondence information 210, the interface identifying unit 403 notifies the display image generating unit 404 of the invalid value as the interface data.

Figure 10:
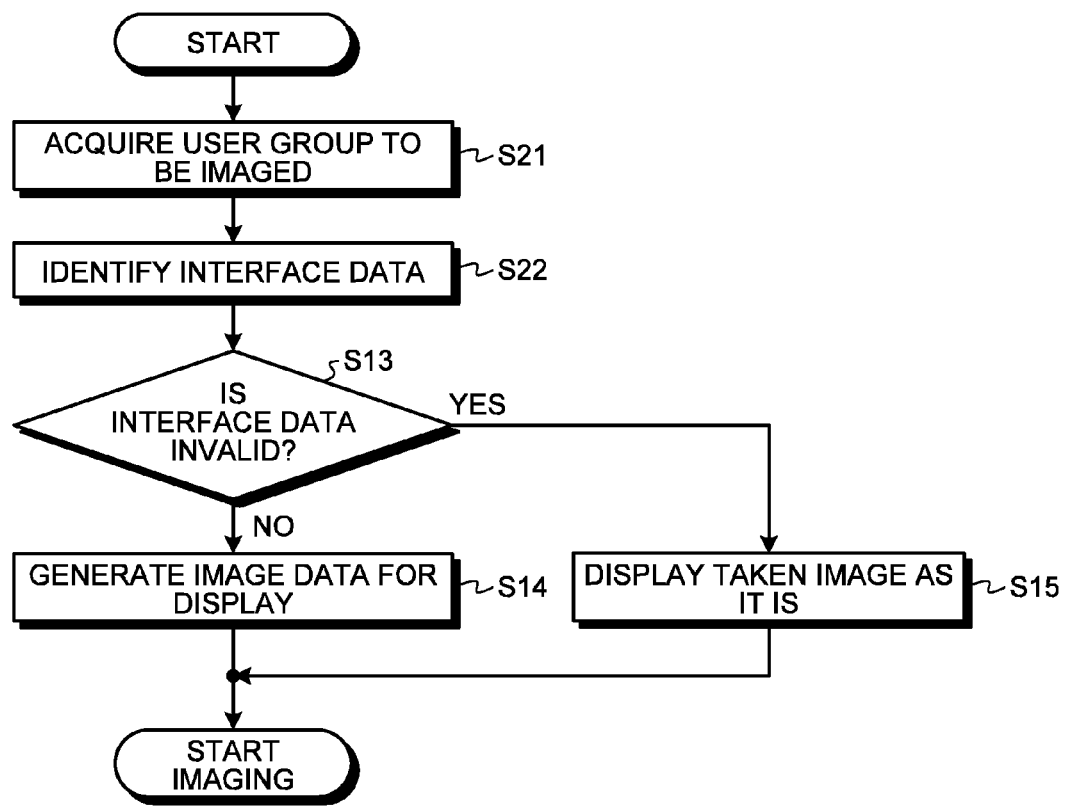
FIG. 10 is a flowchart illustrating the operation of an imaging apparatus according to the second embodiment.

Described next with reference to the flowchart illustrated in FIG. 10 is the setting operation of the interface image for inputting tags to the taken image in accordance with the imaging situation by the imaging apparatus 1 according to the present embodiment. First, the group information acquiring unit 405 acquires the subject information and supplies the acquired subject information to the interface identifying unit 403 (S21).

The interface identifying unit 403 identifies the interface data to be displayed based on the subject information, the UI management information 207, and the group-UI correspondence information 210 and notifies the display image generating unit 404 of the identified interface data (S22). When the interface data cannot be uniquely identified, the interface identifying unit 403 notifies the display image generating unit 404 of the invalid value as the interface data (S22).

The subsequent pieces of processing (S13 to S15) are nearly the same as S13 to S15 of FIG. 7, and the detailed description thereof is omitted. Although the above example describes a case of using only the information on the group to be imaged as the information on the imaging situation, the above position information may be used in combination. In this case, when the interface data cannot be uniquely identified by the processing at S22, the interface identifying unit 403 may identify the interface image data based on the current position, the UI management information 207, the position-UI correspondence information 208, and the map information 209.

When the position information acquiring unit 402 is present within the imaging situation information acquiring unit 401, association with both the position information and the subject information may be taken consideration in the group-UI correspondence information 210. As illustrated in FIG. 9C, for example, correspondence relations with both the position information and the subject information may be defined such as "when the subject to be imaged partially includes I-san, J-san, K-san, L-san, M-san, and N-san and imaging is performed at Location C, Futsal UI is used" and "when the subject to be imaged partially includes I-san, J-san, K-san, L-san, M-san, and N-san and imaging is performed at Location D, Beach Soccer UI is used."

After the end of the imaging processing, the imaging apparatus 1 may automatically transmit tag-given taken image data attached to an e-mail to the imaging apparatuses (or image display apparatuses) of the respective users included in the group to be imaged. This enables tag-input images to be shared.

The present embodiment considers members of the group to be imaged and selects an interface appropriate for the members. This can automatically select the most suitable interface for the activities of a given group. As illustrated in FIG. 9B, the correspondence relation between the group to be imaged and the interface can be set by taking consideration of partial match ("partially include C to H-san," for example) of group members. This can automatically select an appropriate interface even when enjoying sports with any newly invited member added to usual members.

For the ease of description and understanding, the above embodiment describes a case in which the subject information in the group-UI correspondence information 210 and the interface data are associated with each other on a one-to-one basis and the interface identifying unit 403 identifies one piece of interface data. The interface identifying unit 403 can also identify a plurality of pieces of interface data from one piece of subject information.

In this case, a table is recorded that associates the subject information in the group-UI correspondence information 210 and the interface data with each other on a one-to-many basis, and the pieces of identified interface data are subjected to processing such as allowing the user to finally select the interface data to be used based on an order of priority set in advance or displaying a plurality of interface images related to interface data identified by, for example, reducing the display size of the interface image data to be output.

Third Embodiment

Next, the third embodiment according to the present invention is described. The imaging apparatus 1 according to the third embodiment is characterized in that the most suitable interface is selected based on an interface use history. The configuration of the imaging apparatus 1 according to the present embodiment is nearly the same as the configuration illustrated in FIG. 2 and FIG. 3, and the description of the duplicated parts is appropriately omitted.

FIG. 11 is a diagram illustrating the configuration of the position-UI correspondence information 208 according to the present embodiment. As described above, the position-UI correspondence information 208 is the information indicating the correspondence relation between the position information and the interface data. In the present embodiment, the position-UI correspondence information 208 includes the interface use history as the correspondence relation. In this case, the position-UI correspondence information 208 registers therein imaging dates and times together. Specifically, as illustrated in FIG. 11, the position-UI correspondence information 208 is history information including data rows that associate respective imaging locations, interfaces used at the respective imaging locations, and respective imaging dates and times with one another.

Every time the user performs imaging using a tag input interface, a new data row is added to the position-UI correspondence information 208. When "Baseball UI" was used for imaging at "35.XX latitude and 139.XX longitude" (hereinafter, also referred to as Location A) from 18 o'clock on Sunday, Apr. 9, 2011, for example, its use history is added as the data row. Given this situation, there is a case (a case of one-to-many correspondence) in which different interfaces ("Baseball UI", "Baseball practice UI," or the like) are associated with the same location (Location A, for example).

The interface identifying unit 403 determines whether data row corresponding to the current position is present within the position-UI correspondence information 208. When there is no data row corresponding to the current position, the interface identifying unit 403 notifies the display image generating unit 404 of the invalid data as the interface data in the same manner as the first embodiment. When there is only one data row corresponding to the current position, the interface identifying unit 403 notifies the display image generating unit 404 of the interface data of the data row in the same manner as the first embodiment.

When there are a plurality of data rows corresponding to the current position, the interface identifying unit 403 analyzes the plurality of data rows and uniquely identifies the interface data to be notified to the display image generating unit 404 in accordance with an analysis result. The following describes data analysis examples.

As a first example, the interface identifying unit 403 may identify interface data whose use date and time is the newest. In the example of FIG. 11, the interface identifying unit 403 identifies the data related to "Baseball UI" as the interface data corresponding to Location A (because its use on Sunday, Apr. 9, 2011 is the newest).

As a second example, the interface identifying unit 403 may identify interface data that is most frequently used with respect to the current position. In the example of FIG. 11, the interface identifying unit 403 identifies the data related to "Baseball UI" as the interface data corresponding to Location A.

The interface identifying unit 403 may detect regularity of date and time (date, day of the week, time zone, or the like) and identify the interface data in accordance with the detected regularity. The interface identifying unit 403, for example, analyzes an interface use pattern at the current position. In the example of FIG. 11, at Location A, "Baseball practice UI" is used on weekdays (Monday through Friday), "Baseball practice match UI" is used on Saturday, and "Baseball UI" is used on Sunday. The interface identifying unit 403 compares the analysis result taken into consideration of date and time (date, day of the week, time zone, or the like) with the current date and time and identifies the most suitable interface data in accordance with the comparison result. If the date and time when imaging is started is Sunday, for example, the interface identifying unit 403 selects the data related to "Baseball UI" as the interface data corresponding to Location A.

The processing flow is similar to the flowchart illustrated in FIG. 7, and the detailed description thereof is omitted (the details of the selection processing of the interface identifying unit 403 at Step S12 illustrated in FIG. 7 are different).

The present embodiment refers to the previous interface use history and selects an interface based on the analysis result of the use history. Interface selection based on the actual user's use pattern can be performed, and the interface the user desires to use can be selected with high precision.

In particular, the user often does regular activities in accordance with date and time (date, day of the week, time zone, or the like). The present embodiment analyzes whether the user performs regular imaging based on date and time (date, day of the week, time zone, or the like), thereby enabling to perform interface selection depending on the activities of the user with high precision.

Other Embodiments

The imaging situation information acquiring unit 401 analyzes an image during imaging, and in accordance with the analysis result, the interface identifying unit 403 may identify the interface data. The following describes a specific example.

Taken image data (a moving image) is supplied to the imaging situation information acquiring unit 401 from the main memory 206. The imaging situation information acquiring unit 401 may include, in addition to the position information acquiring unit 402 and the like, an image analyzing unit that analyzes a subject to be imaged, the amount of the movement of the subject to be imaged, a voice, or the like within the supplied moving image. The image analyzing unit, for example, reads images of a tennis racket or a tennis ball stored in the main memory 206 and determines whether any matched object is present (that is, whether a tennis racket or a tennis ball is present) within the moving image. When the tennis ball or the tennis racket is detected, the interface identifying unit 403 may identify the interface data related to tennis.

Similarly, the image analyzing unit analyzes whether any word (for soccer, "offside," "centering," "sliding," "volley shot," or the like) related to a specific sport (or a drama) has been detected within the voice of the moving images. In accordance with the analysis result indicating whether any related word has been detected, the interface identifying unit 403 may identify the interface data.

The image analyzing unit detects the amount of the movement of the subject to be imaged within the moving image and determines whether the amount of the movement is large. The interface identifying unit 403 may identify interface data related to a sport frequently used when a moving image in which the amount of the movement of the subject to be imaged is large is taken and may identify interface data most frequently used other than sports when a moving image in which the amount of the movement of the subject to be imaged is small is taken.

According to the configuration including the image analyzing unit, an appropriate interface depending on the subject to be imaged can be automatically selected even when the interface cannot be identified by the current position and the group to be imaged.

The analysis result of the moving image, the current position, and the like are an example of the imaging situation, and the interface may be selected based on any other information (weather, for example) related to imaging. It goes without saying that the image analyzing unit may perform the analysis of still images as well as the analysis of moving images.

Although the present invention has been described with reference to the above embodiments, it is understood that the present invention is not limited to the constitutions of the above embodiments and includes various alterations, modifications, and combinations that can be achieved by those skilled in the art within the scope of the present invention.

It is understood that, for example, part of the information stored in the main memory 206 may be stored in a storage device (a USB memory, for example) that is attachable and detachable to and from the imaging apparatus 1. The imaging apparatus 1 may appropriately download information to be stored in the main memory 206 from a network. At least part of the information stored in the main memory 206 may be stored in a storage unit (not illustrated) within the central controller 400.

Any processing of the central controller 400 can also be achieved by causing a central processing unit (CPU) to execute a computer program. In this case, the computer program can be stored using various types of non-transitory computer readable media to be supplied to a computer. The non-transitory computer readable media include various types of tangible storage media. Examples of the non-transitory computer readable media may include magnetic recording media (flexible disks, magnetic tapes, and hard disk drives, for example), magneto-optical recording media (magneto-optical disks, for example), compact disc read only memories (CD-ROMs), CD-Rs, CD-R/Ws, and semiconductor memories (mask ROMs, programmable ROMs (PROMs), erasable PROMs (EPROMs), flash ROMs, and random access memories (RAMs), for example). The computer program may be supplied to the computer by various types of transitory computer readable media. Examples of the transitory computer readable media may include electric signals, optical signals, and electromagnetic waves. The transitory computer readable media can supply the computer program to the computer via a wired communication path such as an electric wire and an optical fiber or a wireless communication path.

Embodiments of the present invention include not only a case of achieving the functions of the above embodiments by causing the computer to execute a computer program that achieves the functions of the above embodiments but also a case of achieving the functions of the above embodiments by causing the computer program to cooperate with an operating system (OS) or application software operating on the computer. In addition, embodiments of the present invention include a case of achieving the functions of the above embodiments by performing the whole or part of the processing of this computer program by a function expansion board inserted into the computer or a function expansion unit connected to the computer.

Although the present invention is described above for the imaging apparatus, the present invention can also be applied to an apparatus having no imaging capability. The following describes an application system including an apparatus having no imaging capability.

The application system includes an imaging apparatus being able to take a still image and a moving image (hereinafter, assumed to be a video camera) and any communication apparatus (hereinafter, assumed to be a portable terminal apparatus) communicable with the imaging apparatus. The application system can be used for a case, for example, in which a user, while viewing a sport match at a match site, performs imaging with the video camera using a pan head and appropriately inputs tags to taken image data. The user automatically performs the imaging with the pan head set and operates the portable terminal apparatus, which is easy to be held, to perform tag inputting operation while grasping the progress of the match with the naked eyes.

Although the portable terminal apparatus includes the interface identifying unit 403 within the central controller 400 and the liquid crystal monitor 304, it does not require to have imaging capability. It is assumed that the portable terminal apparatus and the video camera are physically closely positioned. Given this situation, even when the imaging situation information acquiring unit 401 is present within a smartphone and detects the above imaging situation, the detected situation can be regarded to be equal to the imaging situation of the video camera. The imaging situation information acquiring unit 401 may be present only within the video camera, and the portable terminal apparatus may appropriately acquire information on the imaging situation from the imaging situation information acquiring unit 401 within the video camera.

The interface identifying unit 403 within the portable terminal apparatus selects the interface by the above method in accordance with the acquired imaging situation and displays the selected interface image on the liquid crystal monitor 304. The user appropriately inputs tags through operation on the portable terminal apparatus. The portable terminal apparatus stores therein the input tags and time information associated with each other in any storage device. The respective tags stored in the storage device and the taken image data of the video camera are associated with each other, thereby enabling to obtain tag-given taken image data. In this case, it is assumed that the time information of the video camera and the time information of the portable terminal apparatus are synchronized with each other.

Every time the tag is input, the portable terminal apparatus may transmit the input contents to the video camera. When a communication time is negligibly small, the tag-given taken image data can be obtained.

Also in the above constitution, the portable terminal apparatus can automatically identify the interface data in accordance with the imaging situation and display the interface image generated based on the identified interface data on the liquid crystal display. In other words, the interface data is automatically identified in accordance with the imaging situation, and the user can save the trouble of selecting the interface.

Also in the application system, any processing of the central controller 400 within the communication apparatus (the portable terminal apparatus in the above example) can be achieved by causing a central processing unit (CPU) to execute a computer program.

In a system in which the imaging apparatus or the portable terminal apparatus performs network communication including wireless communication with an external server to transmit and receive various kinds of data therebetween, the present invention can also be applied to the external server.

Specifically, the external server acquires information on the imaging situation such as the position information of the imaging apparatus or the like by deriving it by itself, by receiving it from the imaging apparatus, or the like, and based on the information on the acquired imaging situation, identifies the interface data appropriate for the imaging situation from among pieces of interface data stored in the server. The identified interface data or interface image data generated from the identified interface data is transmitted and output to the imaging apparatus or the like via network communication.

Thus, while reducing various kinds of processing loads of the imaging apparatus or the like, the user can use the interface image for inputting tags to the taken image data automatically changed in accordance with the imaging situation.

The image processing apparatus, the method for processing an image, and the computer program according to the present invention can automatically change the interface image for inputting tags to the taken image data in accordance with the imaging situation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
a taken image data acquiring unit configured to acquire taken image data;
an imaging situation information acquiring unit configured to acquire a position information of a location for acquiring the taken image data as information on an imaging situation of the taken image data;
a storage unit configured to store therein a plurality of pieces of interface data related to a tag to be attached to the taken image data and a history information in which past position information of the location for acquiring the taken image data and a user interface which has been used in the location for acquiring the taken image data and which can attach the tag to the taken image data are associated with each other;
an interface identifying unit configured to identify a plurality of pieces of the interface data from among the pieces of the interface data stored in the storage unit based on current position information acquired by the imaging situation information acquiring unit as well as the past position information of the location for acquiring the taken image data and the user interface which has been used in the location for acquiring the taken image data and associated to the past position information, both of them being included in the history information stored in the storage unit; and
a display image generating unit configured to generate interface image data related to the user interface the interface data identified by the interface identifying unit and to generate image data for display based on the generated interface image data and the taken image data.

2. The image processing apparatus according to claim 1, wherein
the storage unit is further configured to store therein map information indicating a correspondence relation between facility information and facility position information, and
the interface identifying unit is further configured to identify the interface data based on the map information.

3. The image processing apparatus according to claim 1, wherein
the storage unit is further configured to store therein person correspondence information indicating a correspondence relation between the interface data and a person or a group of persons as a subject to be imaged,
the imaging situation information acquiring unit is configured to acquire subject information on the subject to be imaged or the group of subjects to be imaged, and
the interface identifying unit is configured to identify the interface data based on the subject information and the person correspondence information.

4. The image processing apparatus according to claim 1, wherein
the imaging situation information acquiring unit is configured to generate image analysis information including information on at least one of an amount of movement of an object, a voice, and presence or absence of a certain subject to be imaged within the taken image data, and
the interface identifying unit is configured to identify the interface data based on the image analysis information.

5. A method for processing an image to be executed in an image processing apparatus, the method comprising:
acquiring taken image data;
acquiring a position information of a location for acquiring the taken image data as information on an imaging situation of the taken image data;
referring to a storage unit that stores therein a plurality of pieces of interface data related to a tag to be attached to the taken image data, and identifying a plurality of pieces of the interface data from among the pieces of the interface data stored based on current position information acquired and a history information in which past position information of the location for acquiring the taken image data, a date and a time of acquiring the taken image data, and a user interface which has been used in the location for acquiring the taken image data and which can attach the tag to the taken image data are associated with each other; and
generating interface image data related to the user interface based on the identified interface data and generating image data for display based on the generated interface image data and the taken image data.

6. A non-transitory computer-readable storage medium having stored thereon a computer program that causes a computer to execute:
acquiring taken image data;
acquiring a position information of a location for acquiring the taken image data as information on an imaging situation of the taken image data;
referring to a storage unit that stores therein a plurality of pieces of interface data related to a tag to be attached to the taken image data, and identifying a plurality of pieces of the interface data from among the pieces of the interface data stored based on current position information acquired and a history information in which past position information of the location for acquiring the taken image data, a date and a time of acquiring the taken image data, and a user interface which has been used in the location for acquiring the taken image data and which can attach the tag to the taken image data are associated with each other; and generating interface image data related to the user interface based on the identified interface data and generating image data for display based on the generated interface image data and the taken image data.

7. An image processing apparatus, comprising:

an imaging situation information acquiring unit configured to acquire a position information of a location for acquiring the taken image data as information on an imaging situation of the taken image data;

a storage unit configured to store therein a plurality of pieces of interface data related to a tag to be attached to taken image data and a history information in which past position information of the location of acquiring the taken image data, a date and a time of acquiring the taken image data and a user interface which has been used in the location for acquiring the taken image data and which can attach the tag to the taken image data are associated with each other;

an interface identifying unit configured to identify a plurality of pieces of the interface data from among the pieces of the interface data stored in the storage unit based on current position information acquired by the imaging situation information acquiring unit as well as the past position information of the location for acquiring the taken image data and the user interface which has been used in the location for acquiring the taken image data and associated to the past position information, both of them being included in the history information stored in the storage unit; and an output unit configured to output the interface data identified by the interface identifying unit.

* * * * *